United States Patent
Johanning et al.

(10) Patent No.: US 11,578,810 B2
(45) Date of Patent: Feb. 14, 2023

(54) VALVE CONTROL ASSEMBLY

(71) Applicant: Dresser, LLC, Houston, TX (US)

(72) Inventors: Jeffrey Louis Johanning, Ponte Vedra, FL (US); Kyle McKinley Bryan, Jacksonville, FL (US); Gheorghe Dodan, Saint Johns, FL (US); Mark David Kaczmarek, Middleburg, FL (US); James Alex Markert, Middleburg, FL (US); Abdul Raoof Mohamed, Jacksonville, FL (US); Jayesh K Shah, Palantine, IL (US); Orie Woodman Van Doran, Saint Johns, FL (US); Jonathan Clyde Whitten, Orange Park, FL (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/411,324

(22) Filed: Aug. 25, 2021

(65) Prior Publication Data
US 2021/0381613 A1 Dec. 9, 2021

Related U.S. Application Data

(62) Division of application No. 16/459,084, filed on Jul. 1, 2019, now Pat. No. 11,125,350.
(Continued)

(51) Int. Cl.
*F16K 27/02* (2006.01)
*F16K 27/08* (2006.01)
(Continued)

(52) U.S. Cl.
CPC ........ *F16K 27/0263* (2013.01); *F16K 11/207* (2013.01); *F16K 27/08* (2013.01); *F16K 7/075* (2013.01); *F16K 37/0083* (2013.01)

(58) Field of Classification Search
CPC .... F16K 27/003; F16K 27/08; F16K 27/0281; F16K 27/0236; F16K 27/0263;
(Continued)

(56) References Cited

U.S. PATENT DOCUMENTS

| | | | | | |
|---|---|---|---|---|---|
| 583,302 | A | * | 5/1897 | Ewart | F16K 27/07 222/510 |
| 1,619,335 | A | * | 3/1927 | Donnelly | F16K 27/02 251/366 |

(Continued)

OTHER PUBLICATIONS

Becker VRP-SB-CH Series Valve Regulator Pilots Instruction Manual (2017), General Electric Company.
(Continued)

*Primary Examiner* — William M McCalister
(74) *Attorney, Agent, or Firm* — Paul Frank + Collins P.C.

(57) ABSTRACT

A valve control is configured for use with control valves and other flow controls. The valve control leverages a simplified structure to avoid problems with manufacture and reduce costs. This structure includes a support unit that compresses parts of a valve housing together. Inside of the valve housing, the structure incorporates diaphragms that cause a pair of balanced valves to move in response to changes in pressure of fluid in a conduit. For industrial application, the valve control finds use to maintain pressure of natural gas in pipelines downstream from a control valve.

18 Claims, 12 Drawing Sheets

Related U.S. Application Data

(60) Provisional application No. 62/817,073, filed on Mar. 12, 2019.

(51) Int. Cl.
*F16K 11/20* (2006.01)
*F16K 7/07* (2006.01)
*F16K 37/00* (2006.01)

(58) Field of Classification Search
CPC ........ F16K 11/10; F16K 11/207; F16K 7/075; F16K 37/0083
USPC ....................................................... 251/367
See application file for complete search history.

(56) References Cited

U.S. PATENT DOCUMENTS

| | | | | |
|---|---|---|---|---|
| 1,671,789 A * | 5/1928 | Smith | F16L 21/04 | 285/133.11 |
| 1,841,789 A * | 1/1932 | Connolly | F16K 27/0281 | 251/266 |
| 2,454,160 A * | 11/1948 | Greene | F16K 27/0281 | 137/271 |
| 2,479,612 A * | 8/1949 | Glidden | F16J 15/0881 | 292/256.73 |
| 2,694,547 A * | 11/1954 | MacGregor | F16K 27/08 | 251/330 |
| 2,783,021 A * | 2/1957 | Bickley | F16K 31/0655 | 251/336 |
| 2,863,631 A * | 12/1958 | Boteler | F16K 7/126 | 29/213.1 |
| 3,202,170 A * | 8/1965 | Holbrook | F16K 11/044 | 137/625.5 |
| 3,443,789 A * | 5/1969 | Bucklin | F16K 3/12 | 251/360 |
| 3,504,888 A * | 4/1970 | Haines | F16K 31/508 | 251/266 |
| 3,799,191 A * | 3/1974 | Burkhardt | F16K 27/08 | 137/454.2 |
| 3,847,374 A * | 11/1974 | Tittelbach | F16K 27/02 | 285/133.11 |
| 3,863,668 A * | 2/1975 | Waters | F16K 27/00 | 285/55 |
| 3,915,194 A * | 10/1975 | Friedrich | F15B 13/0817 | 137/271 |
| 3,951,170 A * | 4/1976 | Hill | F16K 27/04 | 137/625.48 |
| 4,054,155 A * | 10/1977 | Hill | F16K 31/1221 | 137/625.48 |
| 4,067,357 A * | 1/1978 | Ruchser | F15B 13/0405 | 137/596.18 |
| 4,285,500 A * | 8/1981 | Illing | F16L 23/006 | 285/133.11 |
| 4,304,257 A * | 12/1981 | Webster | B01J 4/02 | 137/884 |
| 4,337,919 A * | 7/1982 | Ripert | F16K 5/0647 | 251/315.08 |
| 4,384,736 A * | 5/1983 | Hartung | F16L 41/021 | 277/609 |
| 4,420,140 A * | 12/1983 | Gachot | F16K 1/22 | 251/307 |
| 4,471,799 A * | 9/1984 | Buck | F16K 27/02 | 137/454.2 |
| 4,588,164 A * | 5/1986 | Kemp | F16K 27/044 | 251/327 |
| 4,615,353 A * | 10/1986 | McKee | F16K 11/044 | 251/61.3 |
| 4,699,354 A * | 10/1987 | Gibson | F16K 31/145 | 251/367 |
| 4,714,233 A * | 12/1987 | Oates | E21B 34/02 | 137/75 |
| 4,745,938 A * | 5/1988 | Nimberger | F16K 41/02 | 137/15.18 |
| 4,791,955 A * | 12/1988 | Reip | F16K 17/105 | 137/488 |
| 4,936,546 A * | 6/1990 | Berchem | F16K 5/0647 | 251/315.04 |
| 5,065,666 A * | 11/1991 | Young | F15B 13/07 | 91/518 |
| 5,205,539 A * | 4/1993 | Schalk | F16K 27/0236 | 251/367 |
| 5,505,226 A * | 4/1996 | Breth | F16K 49/00 | 251/291 |
| 5,603,484 A * | 2/1997 | Dole | F16K 27/0218 | 251/367 |
| 5,762,102 A * | 6/1998 | Rimboym | G05D 16/0655 | 137/627.5 |
| 5,868,378 A * | 2/1999 | McMahon | F16K 5/0647 | 251/315.08 |
| 6,192,912 B1* | 2/2001 | Butler | F16K 27/0281 | 137/15.19 |
| 6,789,781 B2* | 9/2004 | Johnson | F16K 7/126 | 251/291 |
| 6,901,961 B2* | 6/2005 | Roberts | F16K 11/0712 | 137/625.25 |
| 7,628,380 B1* | 12/2009 | Beaumont | F16K 41/026 | 251/368 |
| 8,220,478 B2* | 7/2012 | Hamer | F15B 13/0839 | 137/625.6 |
| 8,408,237 B2* | 4/2013 | Tejada | F16K 27/003 | 251/366 |
| 8,439,329 B2* | 5/2013 | Kresse | F15B 19/002 | 251/30.01 |
| 8,522,825 B2* | 9/2013 | Igarashi | F16K 27/003 | 411/101 |
| 8,944,103 B2* | 2/2015 | Opdenbosch | E02F 9/2235 | 137/596.14 |
| 8,960,217 B2* | 2/2015 | Inagaki | F16K 11/0716 | 137/625.68 |
| 10,088,054 B2* | 10/2018 | Pelfrey | F16K 17/30 | |
| 11,073,281 B2* | 7/2021 | Hazzard | G05B 19/0426 | |
| 11,125,350 B2* | 9/2021 | Johanning | F16K 27/08 | |
| 2012/0216895 A1* | 8/2012 | Fishwick | F16K 31/1268 | 137/625.6 |
| 2014/0150874 A1* | 6/2014 | Garvey | G05D 16/166 | 137/627.5 |
| 2014/0175319 A1* | 6/2014 | Bell | F16K 13/00 | 251/367 |
| 2020/0292089 A1* | 9/2020 | Johanning | F16K 27/0263 | |
| 2021/0381613 A1* | 12/2021 | Johanning | F16K 11/207 | |

OTHER PUBLICATIONS

VPC "BV" Series Valve Pilot Controllers Instruction Manual (2018), VRG Controls LLC.

* cited by examiner

VALVE CONTROL ASSEMBLY

CROSS-REFERENCE TO RELATED APPLICATIONS

This application is a divisional of U.S. Ser. No. 16/459,084, filed on Jul. 1, 2019, and entitled "IMPROVED VALVE CONTROL ASSEMBLY," which claims the benefit of U.S. Ser. No. 62/817,073, filed on Mar. 12, 2019, and entitled "VALVE CONTROL." The content of these applications is incorporated herein by reference in its entirety.

BACKGROUND

Many industries employ flow controls to regulate flow of fluids. Hydrocarbon facilities and utilities, for example, use control valves to manage flow of oil and gas through pipes and pipelines that make up process lines and distribution networks. The control valves may include a valve that couples in-line with the conduits. An actuator often accompanies the valve. This actuator provides force necessary to move components that restrict or permit flow through the valve. In many cases, various instruments are often necessary to operate the actuator. These instruments may include valve controls (or valve regulators or "regulator pilots") that couple with both the actuator and the adjacent pipe. These devices are useful to sense and maintain pressure of fluid in the conduit downstream of the valve.

SUMMARY

The subject matter of this disclosure relates to construction of the valve controls. Of particular interest herein are embodiments of a valve control with structure that requires significantly less secondary machining or post-manufacture processing to complete assembly of the device. These embodiments may leverage a support structure that compresses or "squeezes" together parts of a valve housing. These parts may enclose a pressure sensing and regulating system. Examples of this system may couple with the actuator of the control valve and with a location on the conduit downstream of the control valve. The system may include a pair of valves, often referred to as "balanced valves" or "seat-and-nozzle valves," one each to regulate a supply of gas to the actuator and an exhaust of gas from the actuator. These valves regulate operation of the actuator in response to variations in pressure of the gas in the conduit relative to a pre-determined value or "setpoint." The actuator, in turn, sets flow of gas through the valve. At the setpoint, the valves are "closed" to prevent flow through both the supply and exhaust. Variations in pressure above the setpoint will cause the supply valve to open, which changes the supply of gas to the actuator. These changes may cause the control valve to close to reduce flow. The supply valve will slowly close until the supply of gas to the actuator normalizes to the setpoint. When pressure falls below the setpoint, the exhaust valve opens to allow gas to exhaust from the actuator to open the control valve to increase flow. The exhaust valve will slowly close as pressure normalizes to the setpoint.

DRAWINGS

Reference is now made briefly to the accompanying drawings, in which.

Figure 1:
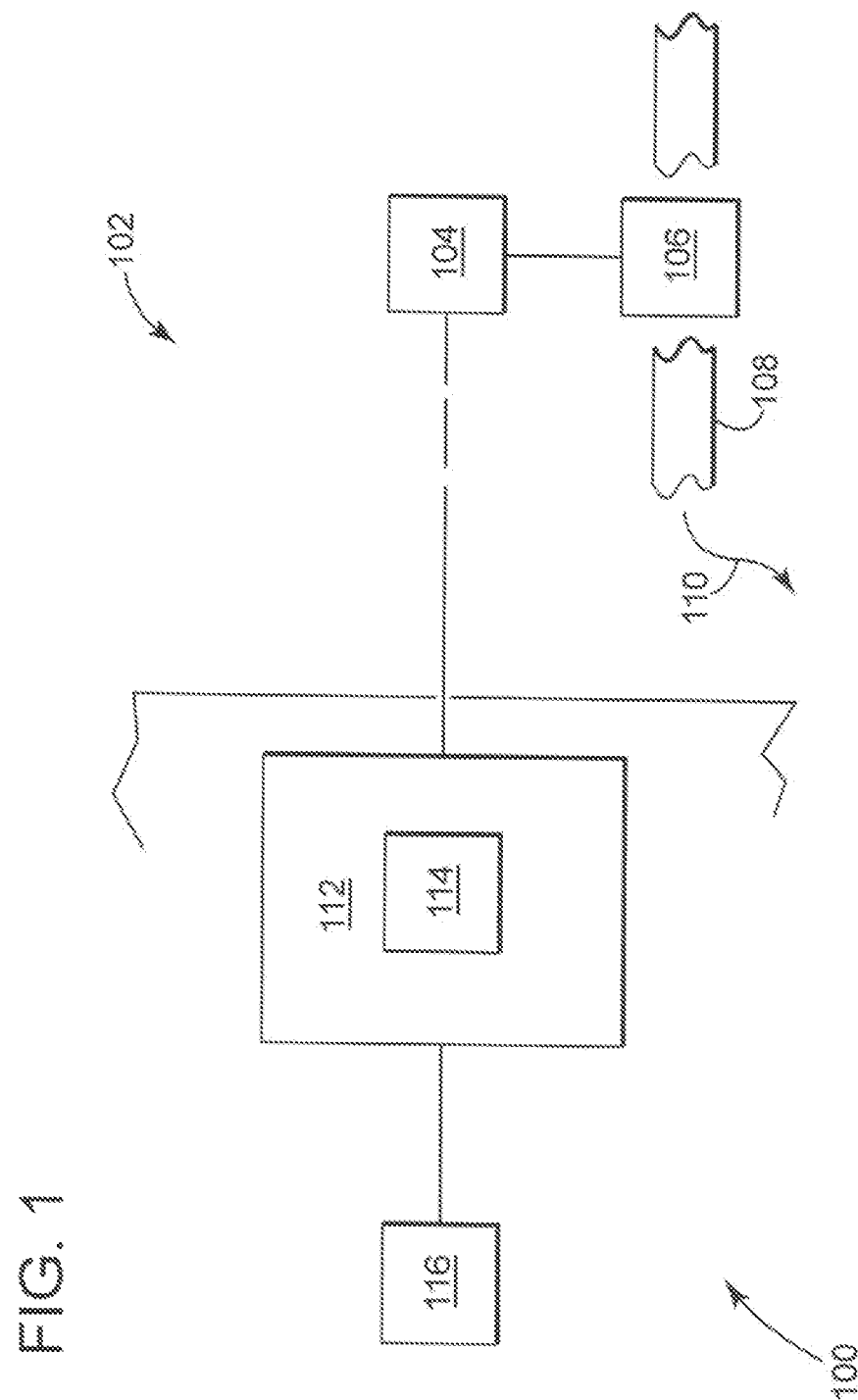
FIG. 1 depicts a schematic diagram of an exemplary embodiment of a valve control.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

Manufacturers often take advantage of opportunities to improve construction of industrial equipment. These opportunities may eliminate components to simplify bill-of-materials or reduce assembly time. Other opportunities may provide better or more reliable functions of the equipment. In many cases, the improvements offer innovative solutions to address fit-and-function for parts that make up the equipment. These solutions can drive savings in the form of lower labor and manufacturing costs for parts and assembly.

As noted above, valve controls play an important role in fluid delivery systems. Designs for these devices accurately maintain flowing fluids at desired or design pressures. For many industrial applications, valve controls must adopt particularly robust or sturdy designs to withstand high pressures, caustic environments, or simply to provide reliable, long-lasting operation. These designs may require construction (e.g., materials, fastening techniques, etc.) that are particularly costly or time-consuming to make or build to specification.

The discussion below contemplates embodiments of a valve control that adopts construction to address these and other limiting design factors. These embodiments realize a number improvements that help to lower costs of manufacture. As an added benefit, the improvements help to simplify assembly of the device, while at the same time allowing for better techniques to ensure more accurate or reliable operation of the valve control in the field. Other embodiments are within the scope of this disclosure.

FIG. 1 depicts a schematic diagram of an exemplary embodiment of a valve control 100. This embodiment may couple to a gas delivery system, identified generally by the numeral 102. The system 102 may include a control valve with an actuator 104, like a pneumatic cylinder, that couples with a valve 106 found on a pressurized delivery line 108. Fluid 110 may flow through the delivery line 108. For purposes of the discussion here, fluid 110 may be natural gas; however, the concepts here may apply to use with other liquids, gases, and liquid/gas mixes as well. As also shown, the valve control 100 may include a pressure monitor with a support unit 112 that supports a valve unit 114. A manifold unit 116 may couple with the valve unit 114.

Broadly, the valve control 100 is configured to respond to changes in pressure of flow of fluids (including both liquids and gasses). These configurations leverage a robust design to help manage flow of natural gas (and other materials). This design simplifies manufacture and assembly in a number of ways. For example, the design requires minimal fasteners. This feature not only reduces the number of parts in the assembly, but also drastically reduces machine time to fabricate certain structures (e.g., housings) that the fasteners connect to complete the device. Also, the design uses parts that integrate certain alignment elements to allow technicians to more easily align parts prior final assembly.

The gas delivery system 102 may be configured for materials to transit industrial sites or parts of larger networks. These configurations may include myriad control valves. The actuator 104 on these control valves may generate a load to operate the valve 106 under high pressure, which may exceed 800,000 in/lbs in some applications. This load can maintain a closure member, like a ball or plug, in position to set flow of fluid 110 through the valve 106 within certain parameters (including pressure). For many applications, these parameters are set to meet process conditions or downstream demand and, thus, should change very little over time.

The support unit 112 can be configured to connect various parts together. These configurations may leverage designs that require less labor, machining, or other processes to realize complete assembly of the valve control 100. In practice, these designs may eliminate the need for parts (e.g., fasteners) in lieu of unique use of compression forces, for example, to maintain parts in close contact or relationship with one another. An advantage of this feature is to reduce the number of fasteners (and corresponding parts and part features to receive the fasteners) that are necessary to assembly the device with sufficient robustness for use in the network 102.

The valve unit 114 can be configured to respond to changes in pressure of fluid 110 to change operation of the actuator 104. These configurations may incorporate designs that are amenable to assembly with the support unit 112. These designs may include multiple pieces that integrate with one another to form a housing. Examples of this housing may direct fluid to impinge on certain components (e.g., diaphragms). Movement of these components may, in turn, regulate flow of fluid to the actuator 104.

The manifold unit 116 may be configured to couple the valve unit 114 with the actuator 104 and the delivery line 108. These configurations may include components that can direct flow to specific areas of the valve unit 114. These components may also provide operators with information (e.g., visual, numerical indications) that defines parameters of fluid 110 in the delivery line 108.

Figure 2:
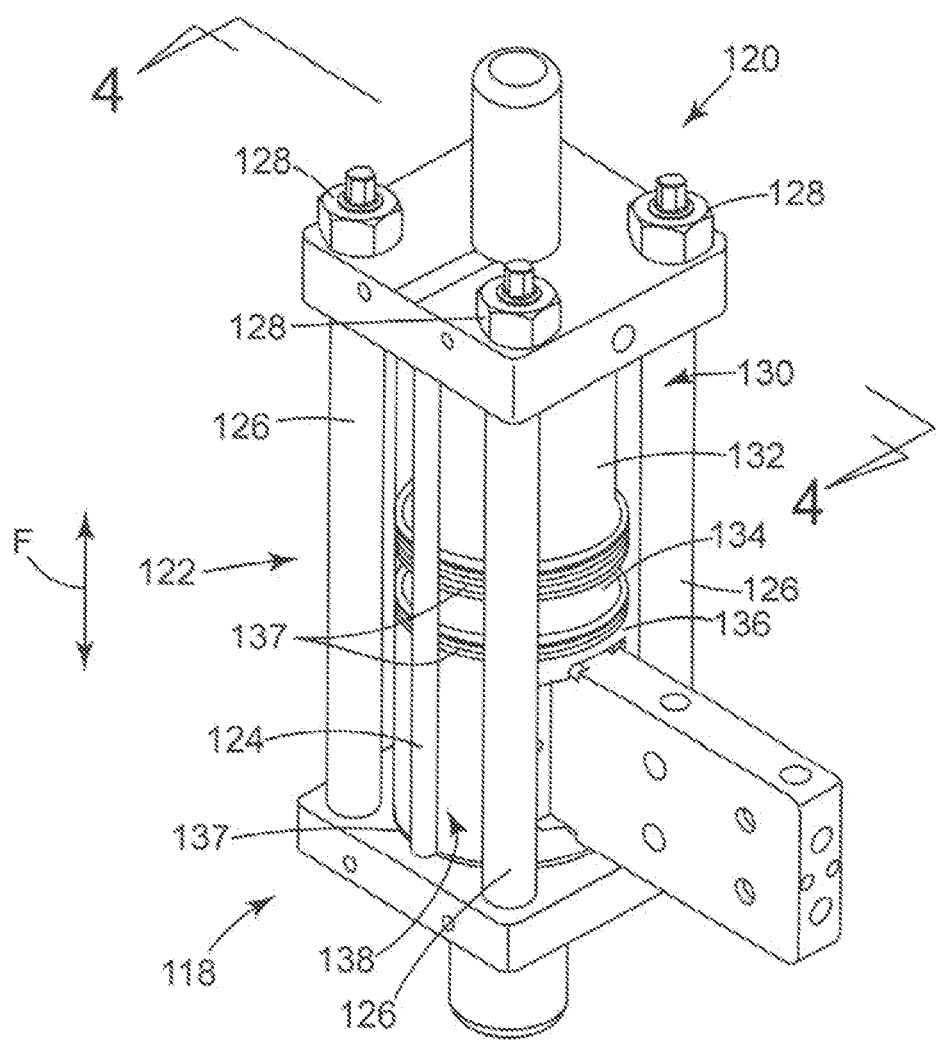
FIG. 2 depicts a perspective view of an example of the valve control of FIG. 1.

FIG. 2 depicts a perspective view from the back of an example of the valve control 100 of FIG. 1 in assembled form. The support structure 112 may include a pair of end caps (e.g., a first end cap 118 and a second end cap 120). The end caps 118, 120 may embody machined billets of steel, aluminum, or other metals. One or more post members 122 may extend between the end caps 118, 120. The post members 122 may embody elongate metal rods (e.g., an alignment rod 124 and tie rods 126). The design also include fasteners 128, like threaded nuts, that affix to one end of the tie rods 126. The number of rods 124, 126 (and corresponding nuts 128) may vary to accommodate variations in the design, as well. In one implementation, the valve unit 114 may include a valve housing 130 that fits between the end caps 118, 120. The valve housing 130 may have a multi-piece design, shown here as a stack of three, separable pieces (e.g., a first piece 132, a second piece 134, and a third piece 136). More or less of the separable pieces 132, 134, 136 may prove useful. The design may prefer cylinders or cylindrical shapes for the pieces 132, 134, 136, but other geometry may work well in the stack. Assembly of the pieces 132, 134, 136 may create one or more annular slots 137 in the stack. As also shown, stack may include an alignment feature 138. Examples of the feature 138 may embody a detent, a groove, or a notch, all of which may penetrate into the material of the cylinder. When assembled, the alignment rod 124 may fit into the detent 138 to maintain or "clock" alignment of the pieces 132, 134, 136 relative to one another and to the end caps 118, 120. Tightening the nuts 128 can apply a clamping force F on the valve housing 130 between the end caps 118, 120 that "squeezes" the pieces 132, 134, 136 together.

Figure 3:
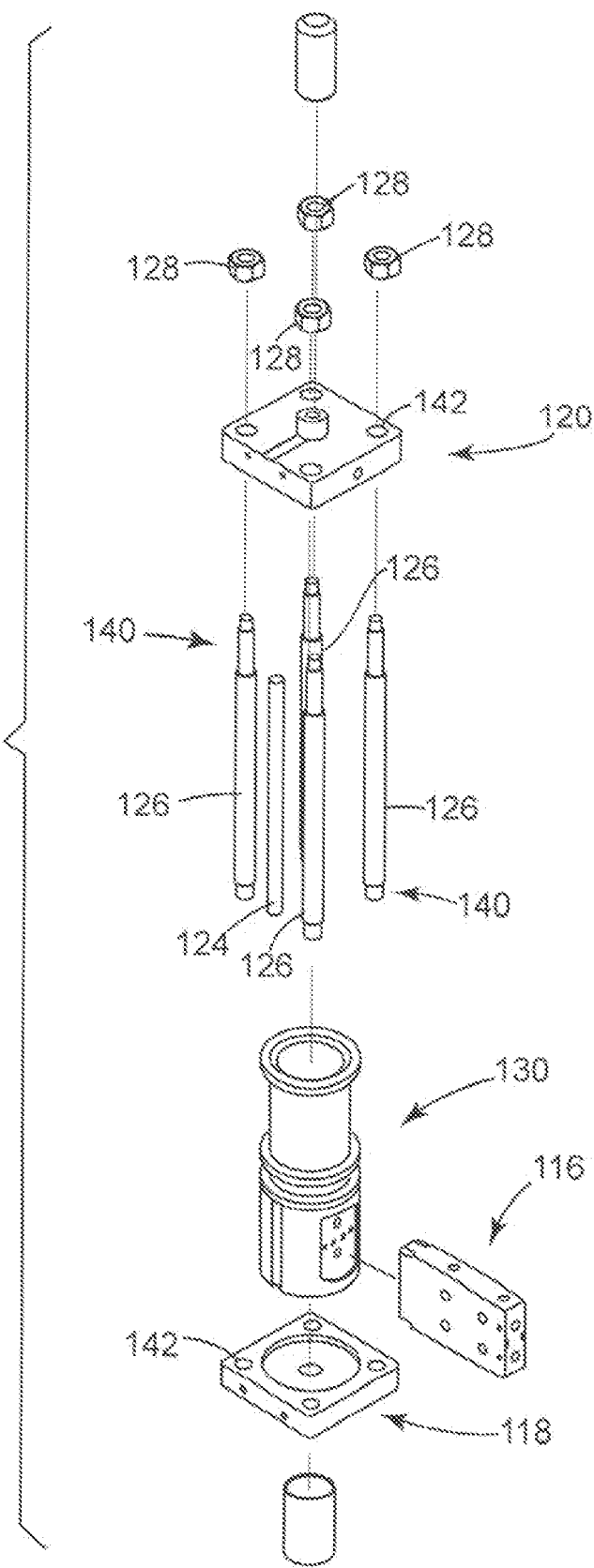
FIG. 3 depicts a perspective view of the valve control of FIG. 2 in exploded form.

FIG. 3 depicts the valve control 100 of FIG. 2 in exploded form. The rods 124, 126 may have a necked-down portion 140 on either end. The necked-down portion 140 may insert into apertures 142 that penetrate into (or through) the end caps 118, 120. On the tie rods 126, the necked-down portion 140 may include threads that engage with complimentary threads in the apertures 142 on the lower end cap 118. Alternatives arrangements may use a fastener (e.g., bolt or screw) that penetrates through the lower end cap 118 into the tie rods 126. On the upper end cap 120, the apertures 142 may embody clearance holes. This arrangement will allow the necked-down portion 140 of the tie rods 126 to penetrate through the upper end cap 120 to expose the threads to receive the nuts 128.

Figure 4:
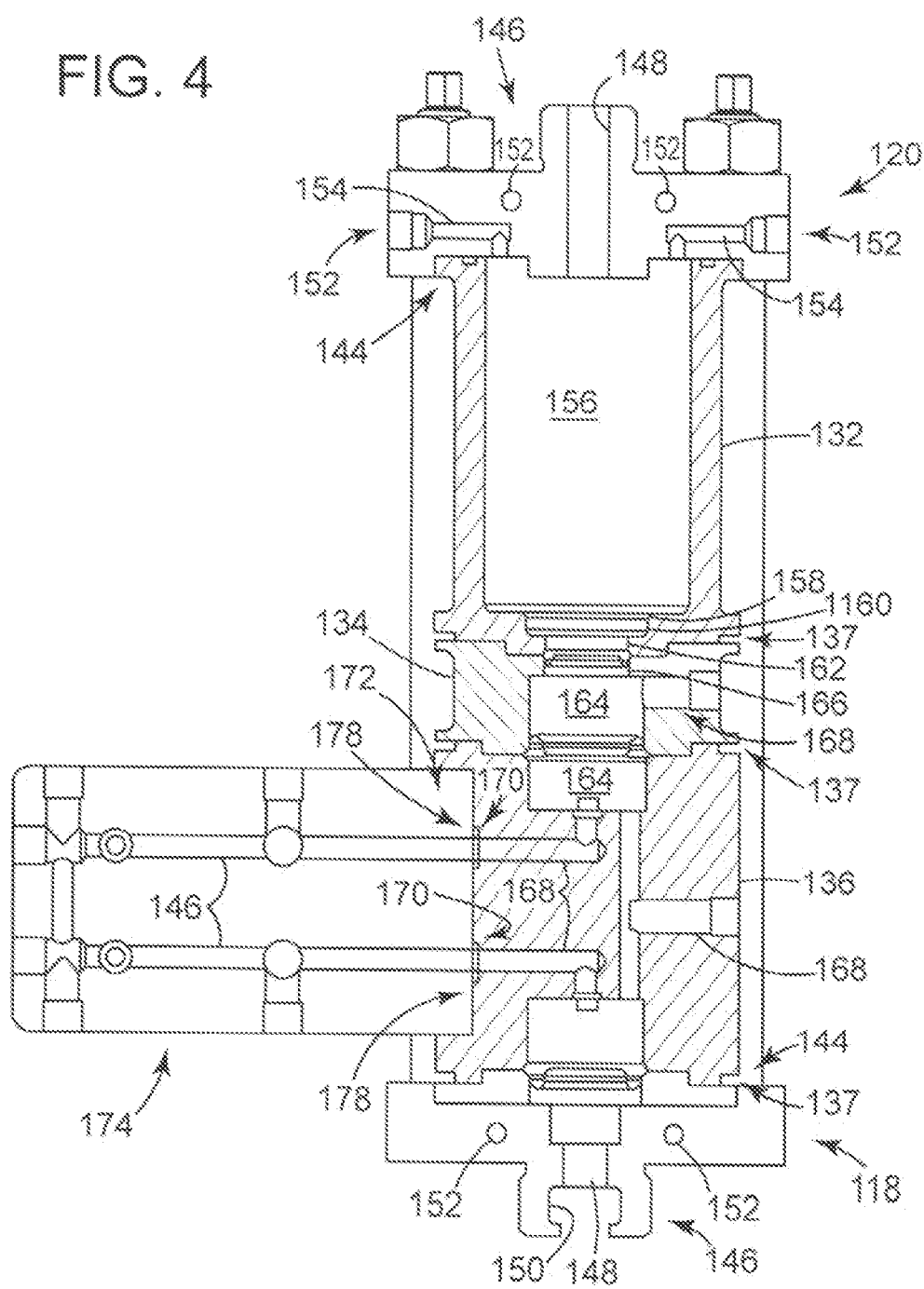
FIG. 4 depicts an elevation view of the cross-section of the valve control of FIG. 2.

FIG. 4 depicts an elevation view of the cross-section of the valve control 100 of FIG. 2 taken at line 4-4. The end caps 118, 120 may have a proximal side with a recess 144, for example, annular or circular features in the material. The distal side of the end caps 118, 120 may have a boss protrusion 146 with cylindrical geometry. A through-hole 148 may penetrate the boss protrusion 146. On the lower end cap 118, the through-hole 148 may have a counter-bore (or counter-sink) that extends from the bottom of the recess 144. The boss protrusion 146 may also include a notched cut-out 150, shown here to create opposing members on either side of the through-hole 148. The end caps 118, 120 may also have apertures 152 disposed in one or more peripheral sidewalls. The apertures 152 may serve as clearance holes for mounting hardware. On the upper end cap 120, some of the apertures 152 may couple with internal flow pathways 154 that terminate in the recess 144 on the proximal side. The flow pathways 154 may communicate with a spring chamber 156 in the upper piece 132. The spring chamber 156 may embody one or more concentric, circular bores of different diameters (e.g., a first bore 158, a second bore 160, a third bore 162). The pieces 134, 136 may include valve chambers 164. On the intermediary piece 134, a bore 166 may penetrate into the valve chamber 164. Internal flow pathways 168 may couple the valve chambers 164 with ports 170. On the lower piece 136, one of the flow pathways 168 may couple the valve chambers 164 with one another (on the lower piece 136). The ports 170 may reside in a recess 172 that extends axially on the lower piece 136. The recess 172 can receive the manifold unit 116, shown here to have a body 174 with internal flow pathways 176 that terminate at ports 178. When assembled, the ports 178 can align with ports 170 on the lower piece 136 to allow fluid to flow between the flow pathways 168, 176.

FIGS. 5, 6, 7, and 8 depict various view of an example of component structure for use on the control valve 100 of FIG. 2. This example incorporates devices that outfit the control valve 100 with functionality to maintain pressure of gas 110 in the delivery line 108. Part of the functionality may "sense" changes in operating conditions relative to a set threshold, for example, over-pressure or under-pressure of the gas 110 in the delivery line 108. The functionality may also respond to the operating condition. This response may modify operation of the actuator 104 to set an operating position of the valve 106 that causes the pressure to return to the set threshold (or within some acceptable tolerances of the same).

Figure 5:
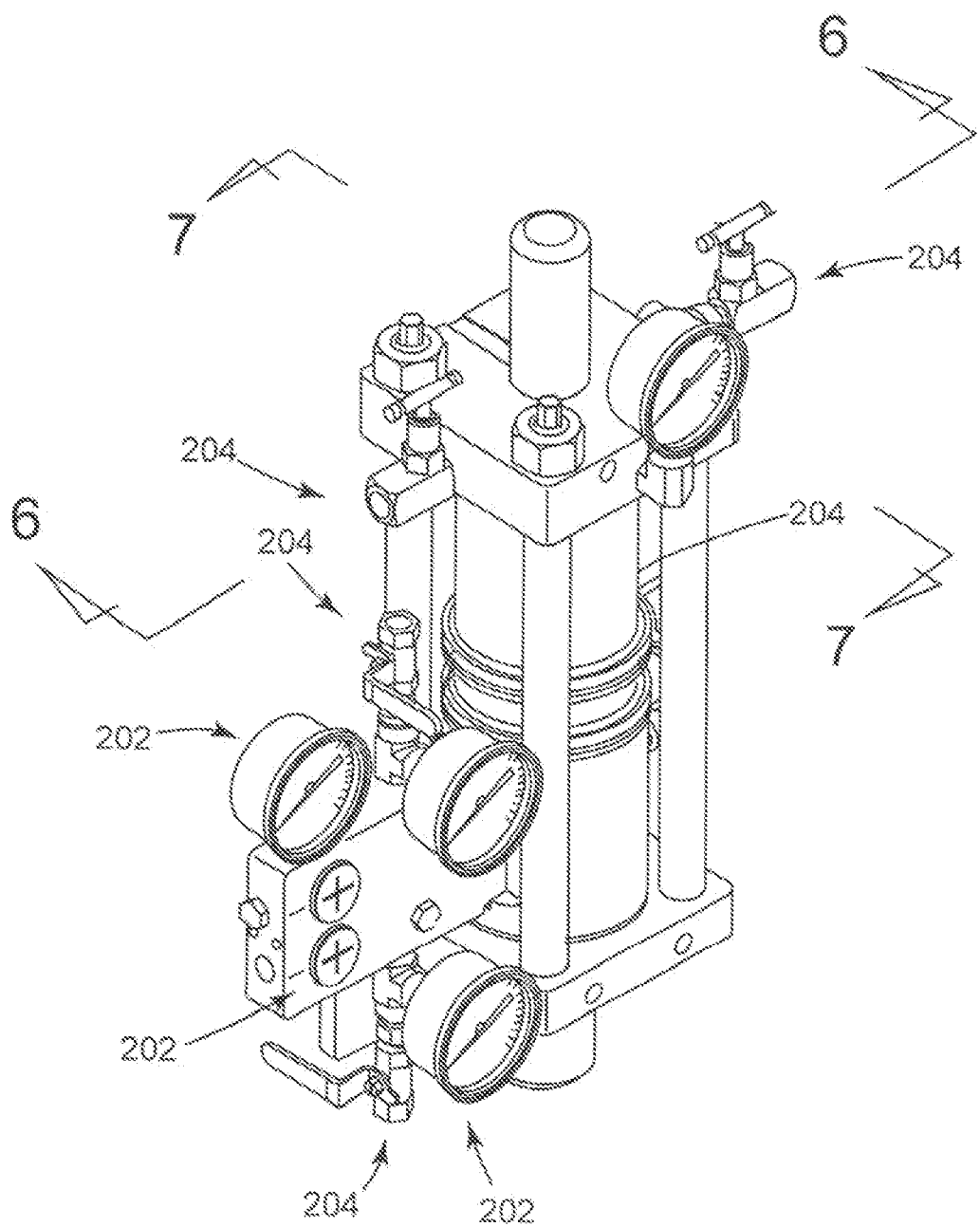
FIG. 5 depicts a perspective view of an example of the valve control of FIG. 1.

FIG. 5 depicts a perspective view of the control valve 100. The component structure may include components that populate the ported body 174, the end caps 118, 120, and the valve housing 130 as well. These components may include measurement devices 202 and fittings 204. The measurement devices 202 may measure parameters of flow, for example, gauges with digital or analog read-outs for technicians to visualize the parameters. As also shown, the fittings 204 may provide fluid connections that can receive hoses or conduit that connect with the actuator 104 or delivery line 108. These fluid connections may include shut-off valves that can restrict or stop fluid flow, as desired.

Figure 6:
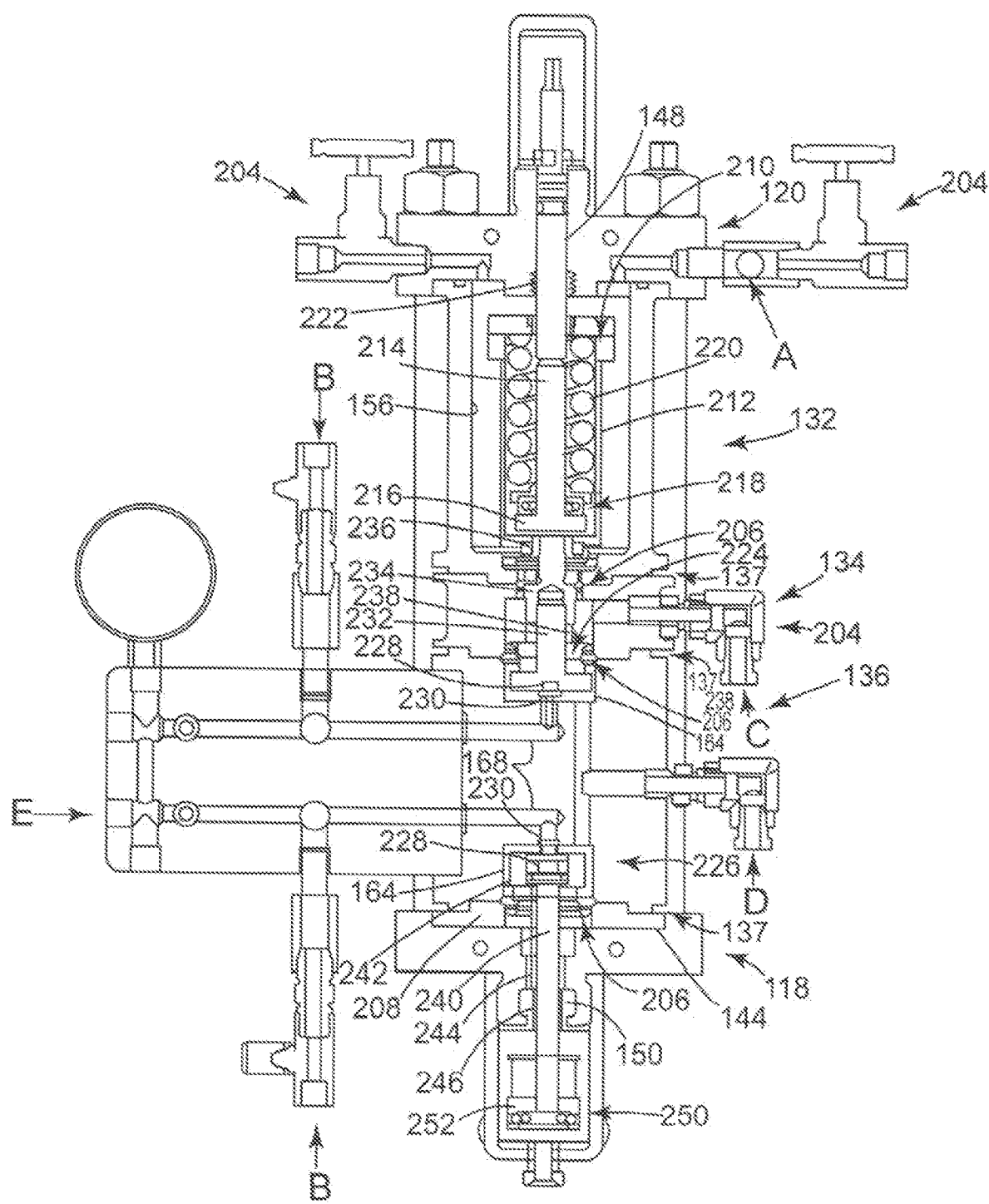
FIG. 6 depicts an elevation view of the cross-section of the valve control of FIG. 5 taken at line 6-6.

FIG. 6 depicts an elevation view of the cross-section of the control valve 100 of FIG. 5 taken at line 6-6. The fluid connections 204 may couple the control valve 100 with the delivery line 108 at A and with the actuator 104 at B. The fluid connections 204 may also couple the control valve 100 with atmosphere at C. Another one of the fluid connections 204 may allow fluid to exhaust (from the actuator 104) at D. The manifold 116 may also require a fluid connection(s) to couple the control valve 100 with input fluid or "power gas" at E. This power gas pressurizes the actuator 104. In one implementation, the components may configure the control valve 100 to respond to changes in pressure of the fluid that flows into the control valve 100 from the delivery line 108 at A. These configurations may incorporate diaphragms 206 into the valve housing 130. The diaphragms 206 may comprise flexible membranes or like resilient members that reside between pieces 132, 134 and between pieces 134, 136. The flexible membranes 206 may also reside between the lower piece 136 and an adapter 208 that fits into the recess 144 on the lower end cap 118. In operation, the flexible membranes 206 may change position in response to pressure of the fluid in the delivery line 108 at A. The position may correspond with flow of fluid to different "sides" of the actuator 104 at B. These sides may correspond with sides of a diaphragm in the actuator 104. As noted above, increasing and decreasing pressure on the sides of the actuator diaphragm may allow the valve 106 to open or close and, thus, change pressure of the fluid 100 in the delivery line 108 downstream of the valve 106.

The component structure may include parts to regulate flow of fluid into and out of the valve control 100 in response to movement of the flexible membranes 206. These parts may include a control spring assembly 210 with a spring housing 212 that resides in the spring chamber 156. The spring housing 212 includes space to receive a spring shaft 214 with a first end forming a spring retaining member 216. A bearing assembly 218 may separate the retaining member 216 from one end of a control spring 220, typically a coiled spring that slides over the spring shaft 214. The spring shaft 210 may have a threaded portion that extends into a threaded insert 222 disposed in the through-hole 148 in the upper end cap 120.

The discussion continues to the lower members 134, 136. The parts may include a pair of valves (e.g., a first valve 224 and a second valve 226). The valves 224, 226 work in concert, along with the control spring assembly 210, to change flow through the ported body 174 to regulate position of the valve 106. As noted above, the valves 224, 226 may embody "balanced valves" or "seat-and-nozzle valves." Systems with "balanced valves" tend not to bleed or exhaust to atmosphere, which may adapt the valve control to meet strict standards and regulations. Systems that employ "seat-and-nozzle valves," on the other hand, often have a constant bleed of fluid to atmosphere. In one implementation, the valves 224, 226 position a seal 228 relative to a pilot 230 that resides at the interface of the flow pathways 168 and the valve chambers 164. The first valve 224 may include a first member 232 that retains the seal 228. The first member 232 threads into a second member 234, shown here coupled with the spring housing 212 using a nut 236. A second nut 238 may separate the members 232, 234. The second valve 226 may include a first member 240 that retains the seal 228 and inserts into a second member 242 with a shaft 244 that extends into through-hole 140 to expose flats 246 in the cut-out 150. The first member 240 may have a shaft 248 with a portion that extends out of the first member 236. An adjustment 250 that may secure to the first member 240. The adjustment 250 may include a knob 252 that can rotate the first member 242.

Figure 7:
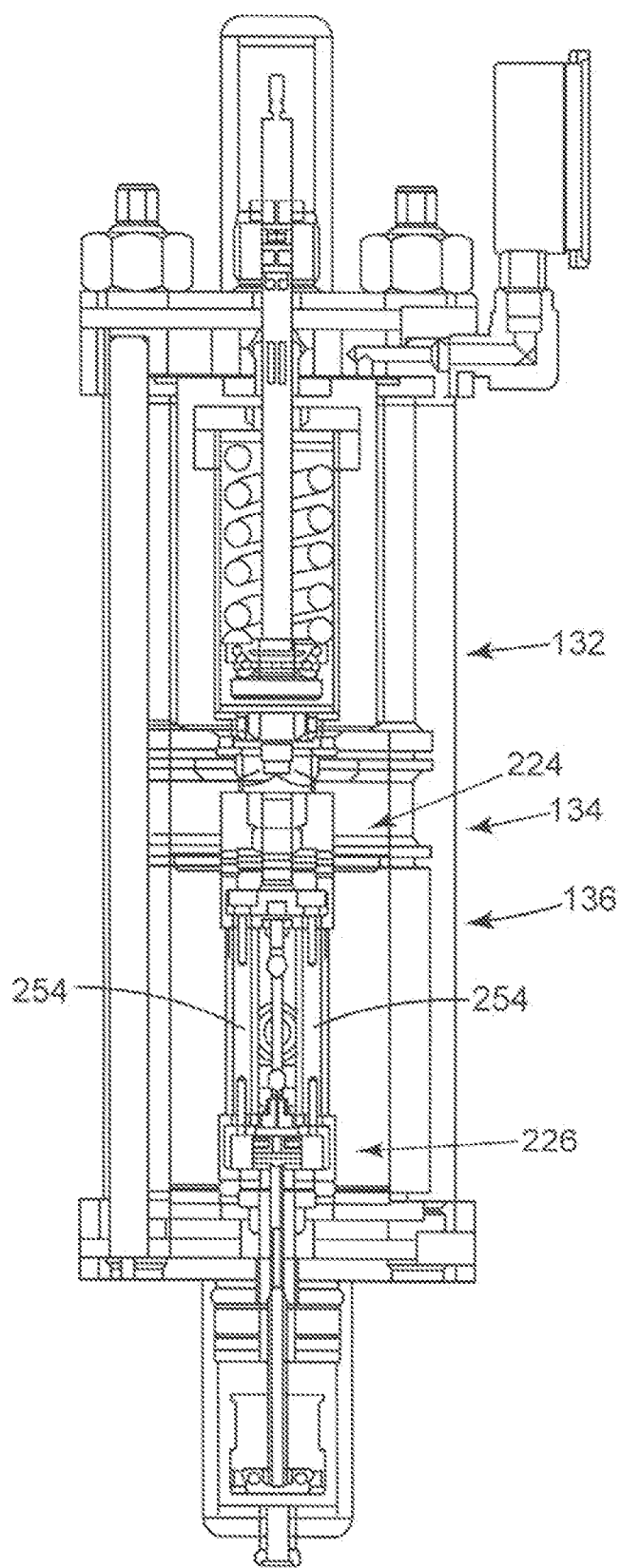
FIG. 7 depicts an elevation view of the cross-section of the valve control of FIG. 5 taken at line 7-7.
Figure 8:
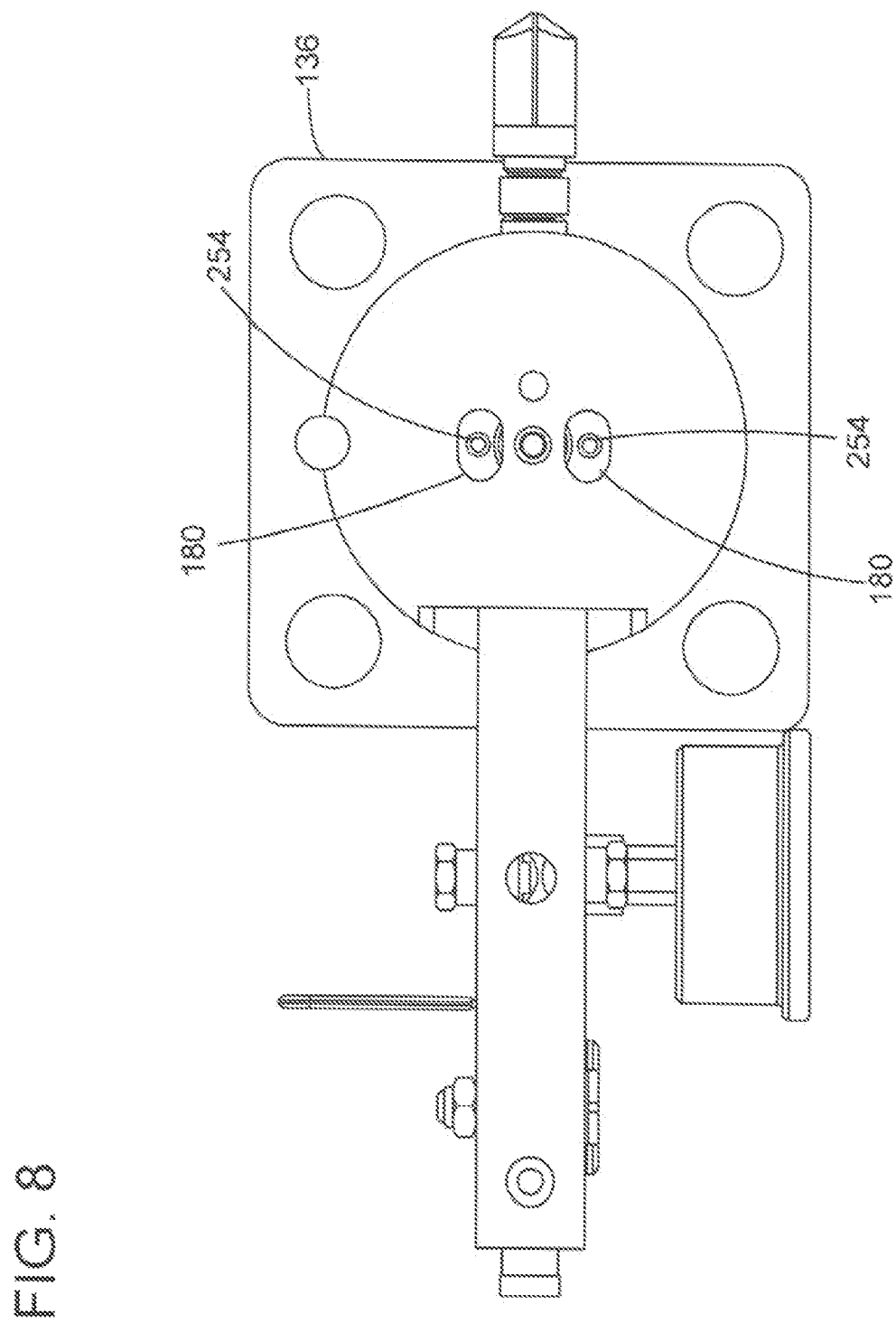
FIG. 8 depicts a plan view of the cross-section of the valve control of FIG. 5 taken at line 8-8.

FIG. 7 depicts an elevation view of the cross-section of the control valve 100 of FIG. 5 taken at line 7-7. The component structure 200 may include a pair of pilot posts 254 that extend between the balanced valves 224, 226. The pilot posts 254 may insert into each of the members 232, 242. Fasteners may secure the assembly. FIG. 8 shows the pilot posts 254 in slots 180 in the lower piece 136 of the valve housing 130. The slots 180 provide clearance about the periphery of the pilot posts 254.

Benefits of the design can be appreciated with collective reference to FIGS. 5, 6, 7, and 8. During assembly, technicians may insert shims or spacers at the annular slots 137. These shims separate adjacent pieces 132, 134, 136 from one another. The technicians may also insert a forked instrument into the notched cut-out 150 to ensure alignment of the internal assembly. In one implementation, the forked instrument can engage with the flats 246, effectively positioning the shaft 244 in its correct orientation relative to the other parts of the assembly. The pilot posts 254 maintain alignment of the internal assembly. The shims avoid displacement of the flexible membranes 206 during this alignment stage of the assembly. Once complete, the technician can remove the shims and the forked instrument and, then, tighten the nuts 128 to clamp the entire structure together. Technicians may manipulate knob 252 to adjust the position of the seal 228 relative to the pilot 230, as well.

Figure 9:
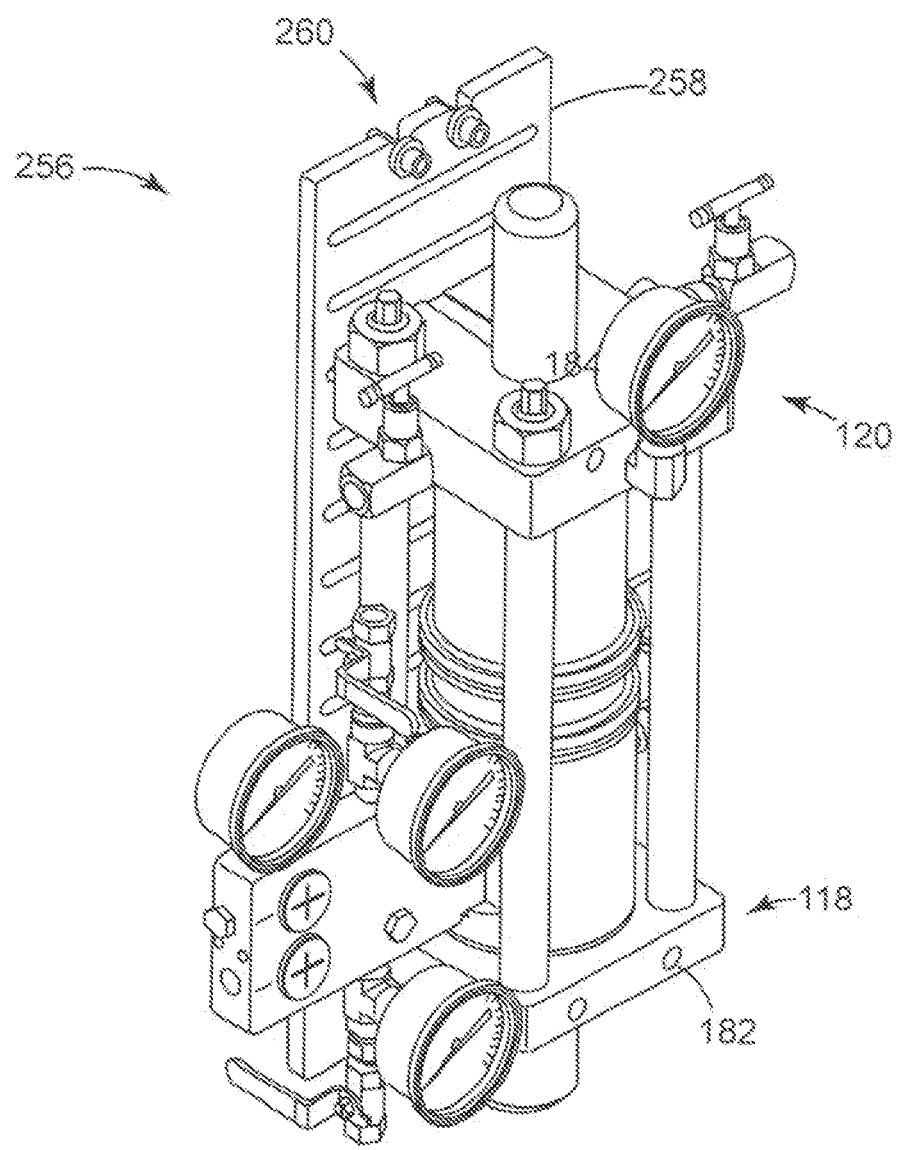
FIG. 9 depicts a perspective view of the valve control of FIG. 5 in a mounted configuration with instrumentation plate.

FIG. 9 depicts a perspective view of the valve control 100 of FIG. 5. The component structure 200 may include a mounting assembly 256, for example, a plate 258 and fasteners 260. The plate 258 may incorporate slots to receive fasteners that penetrate the end caps 118, 120 via apertures 182. In use, the mounting assembly 256 may attach to the actuator 104 or, alternatively, may incorporate as part of a control station that is proximate the actuator 104. Large, industrial facilities are apt to locate these control stations some distance from the actuator 104 to avoid injury to technicians. The slotted plate 258 is useful to allow for modular engagement of the valve control 100. For example, the valve control 100 may mount in vertically different positions so long as slots align with the apertures 182 in the end caps 118, 120. The horizontal position may also vary along the length of the slots as well.

Figure 10:
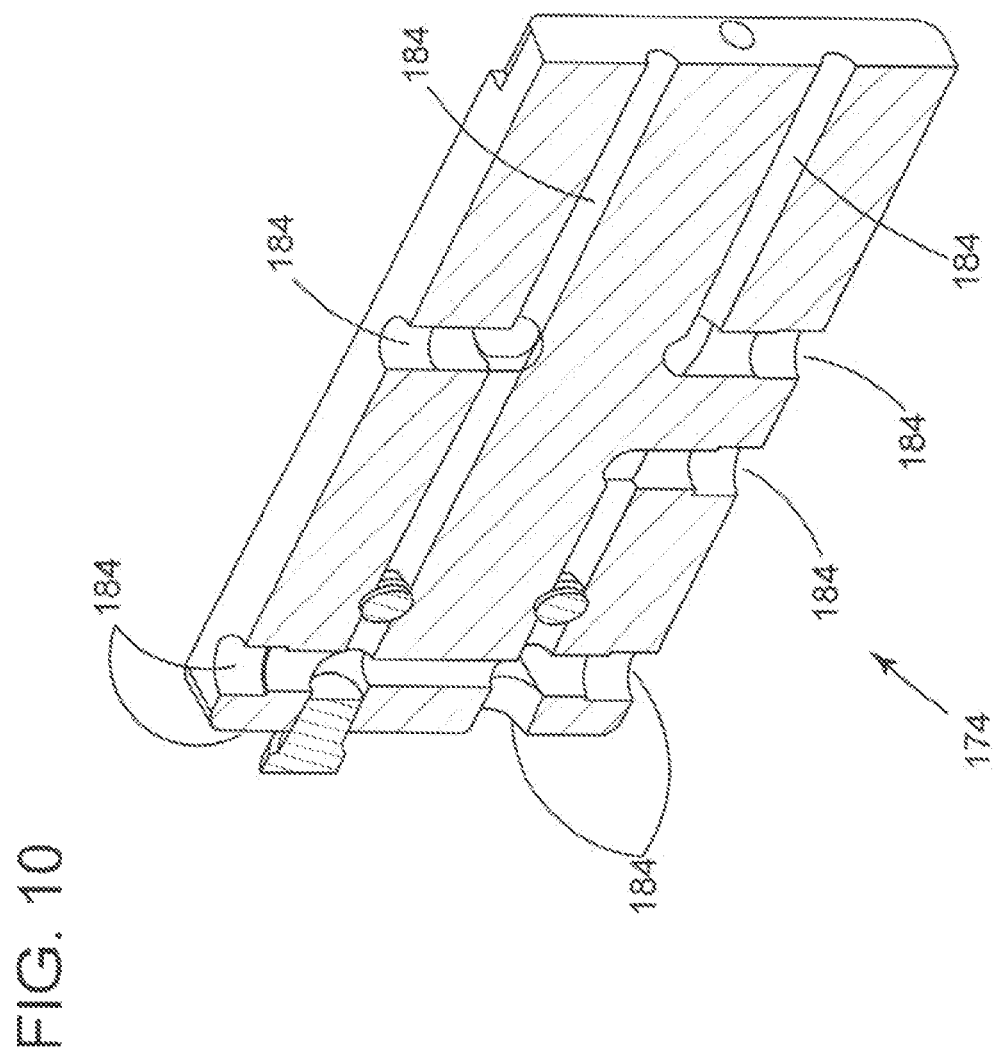
FIG. 10 depicts a perspective view of the cross-section of an example of part of a manifold for use on the valve control of FIGS. 2 and 5.
Figure 11:
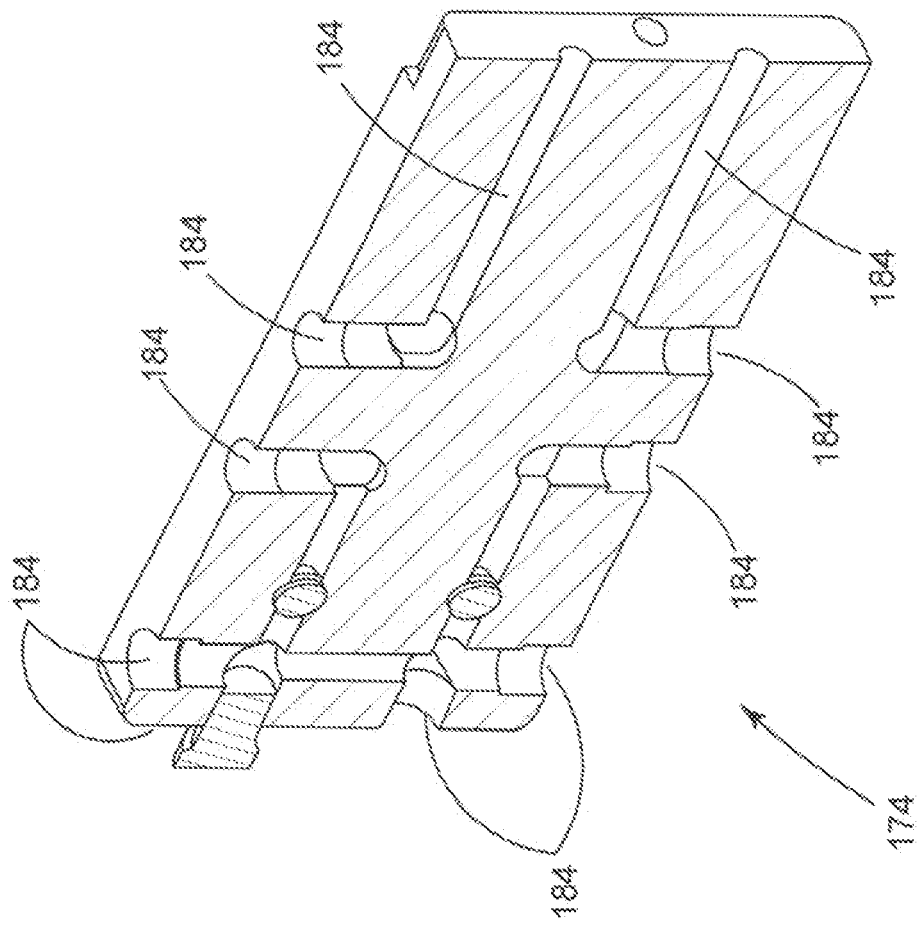
FIG. 11 depicts a perspective view of the cross-section of an example of part of a manifold for use on the valve control of FIGS. 2 and 5.
Figure 12:
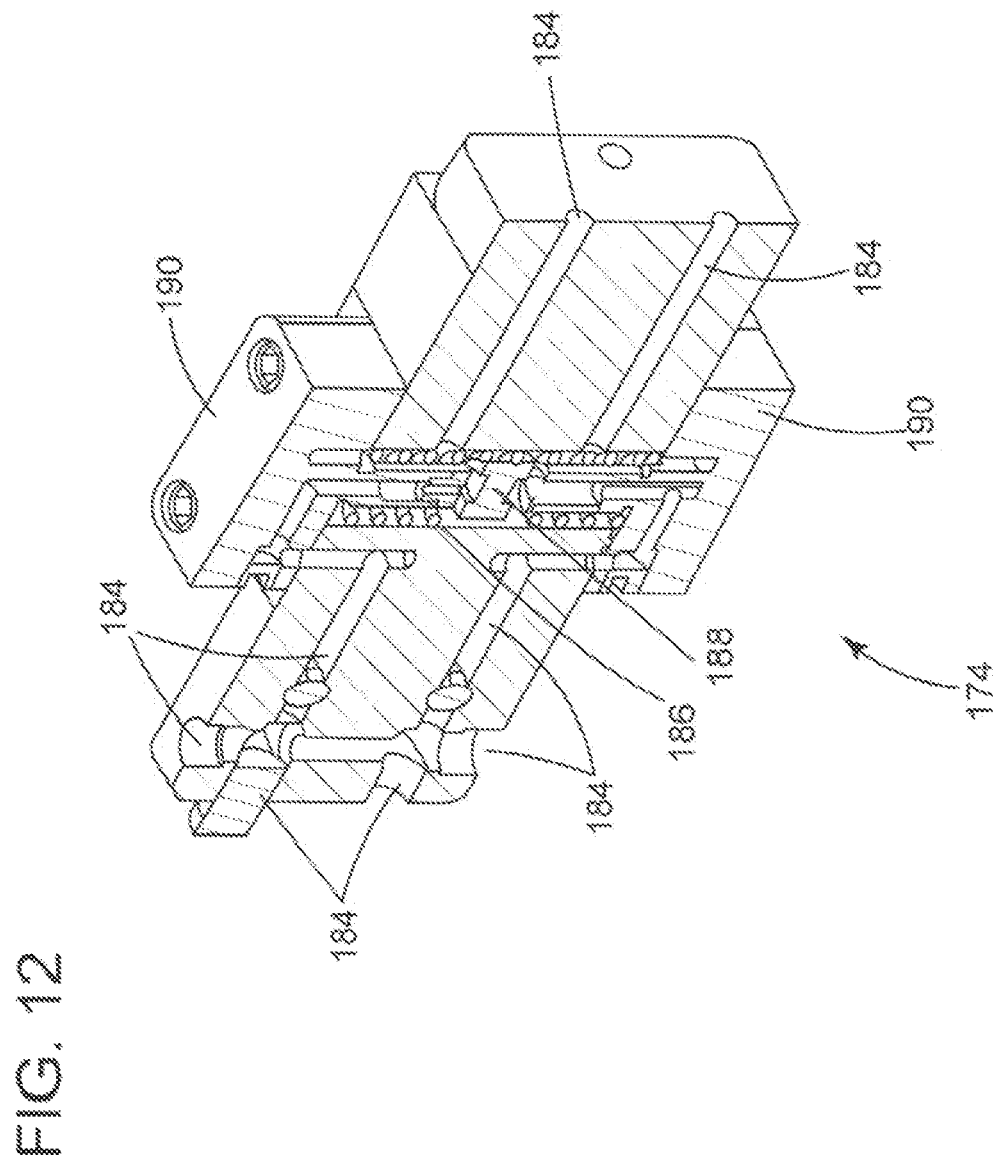
FIG. 12 depicts a perspective view of the cross-section of an example of part of a manifold for use on the valve control of FIGS. 2 and 5.

FIGS. 10, 11, and 12 depict perspective views of the cross-section of examples of the ported body 174 for use in the control valve 100 of FIGS. 2 and 5. The ported body 174 may leverage a unitary or monolithic design, for example, a machined block or billet of material (e.g., metal) with an internal flow network 184, typically cross-drilled holes. These holes permit flow of fluid throughout the monolithic body. FIGS. 10 and 11 show configurations of the cross-drilled holes 184. FIG. 12 depicts another configuration of the cross-drilled holes, as well. The internal flow network 184 may also include machined features to accommodate parts of a no-bleed valve ("NPV"), including springs 186 and plug 188. Caps 190 may mount to either side of the monolithic body to enclose the NPV valve.

In light of the foregoing discussion, the improvements herein result in embodiments that solve various problems with valve controls. These embodiments leverage novel construction to reduce the number of fasteners, which in the past have required technicians to install and tightened more than forty bolts. The improvements here, using the end caps 118, 120 and valve housing 130, reduce that number to four. Further, the unique valve housing 130 incorporates gaps for the spacer shims that work in combination with the notched cut-out 150 and other components to improve and simplify alignment of the assembly internal to the valve housing.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A valve control, comprising:
   a valve unit that comprises separable cylindrical members forming a stack;
   a manifold removably replaceable from a recess in the separable cylindrical members;
   a pair of valves disposed in the stack and operable to control flow of fluid between the separable cylindrical members; and
   a support unit that comprises a pair of end caps disposed in contact with opposite ends of the stack,
   wherein loading the pair of end caps generates a compression force to squeeze the separable cylindrical members together, and
   wherein flow pathways allow fluid to flow from the manifold into the separable cylindrical members.

2. The valve control of claim 1, further comprising:
   fasteners arranged to apply compressive forces on each of the pair of end caps.

3. The valve control of claim 1, further comprising:
   elongate posts that engage with apertures on the end caps; and
   fasteners disposed on the elongate posts that are operable to generate the compression force.

4. The valve control of claim 1, further comprising:
   annular slots in the stack between separable cylindrical members that are adjacent to one another; and
   diaphragms disposed inside of the stack near the annular slots, the diaphragms adapted to move in response to pressure of fluid flowing inside of the separable cylindrical members.

5. The valve control of claim 1, wherein the stack comprises three separable cylindrical members.

6. The valve control of claim 5, wherein the pair of valves are located in two of the three separable cylindrical members.

7. A valve control, comprising:
   a valve unit that comprises separable cylindrical members forming a stack;
   a pair of valves disposed in the stack and operable to control flow of fluid between the separable cylindrical members; and
   a support unit that comprises a pair of end caps disposed in contact with opposite ends of the stack;
   a detent in each of the separable cylindrical members; and
   an alignment rod that engages with the detents to clock the separable cylindrical members with one another and with the pair of end caps,
   wherein loading the pair of end caps generates a compression force to squeeze the separable cylindrical members together.

8. A valve control, comprising:
   a valve unit that comprises separable cylindrical members forming a stack;
   a pair of valves disposed in the stack and operable to control flow of fluid between the separable cylindrical members; and
   a support unit that comprises a pair of end caps disposed in contact with opposite ends of the stack,
   wherein loading the pair of end caps generates a compression force to squeeze the separable cylindrical members together, and
   wherein the pair of valves are balanced valves.

9. A valve control, comprising:
   a valve unit that comprises separable members forming a stack;
   valves disposed in the stack and operable to control flow of fluid between the separable members; and
   a support unit that comprises end caps disposed in contact with opposite ends of the stack,
   a manifold removably replaceable from a recess in the separable cylindrical members, wherein loading at least one of the end caps generates a compression force to squeeze the separable members together, wherein flow pathways allow fluid to flow from the manifold into the separable cylindrical members.

10. The valve control of claim 9, further comprising:
fasteners arranged to apply compressive forces on each of the pair of end caps.

11. The valve control of claim 9, further comprising:
elongate posts that engage with apertures on the end caps; and
fasteners disposed on the elongate posts that are operable to generate the compression force.

12. The valve control of claim 9, further comprising:
annular slots in the stack between separable cylindrical members that are adjacent to one another; and
diaphragms disposed inside of the stack near the annular slots, the diaphragms adapted to move in response to pressure of fluid flowing inside of the separable cylindrical members.

13. A valve control, comprising:
a valve unit that comprises separable members forming a stack;
valves disposed in the stack and operable to control flow of fluid between the separable members; and
a support unit that comprises end caps disposed in contact with opposite ends of the stack,
a detent in each of the separable cylindrical members; and
an alignment rod that engages with the detents to clock the separable cylindrical members with one another and with the pair of end caps,
wherein loading at least one of the end caps generates a compression force to squeeze the separable members together.

14. A system, comprising:
a control valve with a pneumatic actuator; and
a valve control comprising a stack of cylindrical members, each having a detent, an alignment rod that engages with the detents to clock the stack of cylindrical members, a pair of moveable balanced valves disposed inside of the stack of cylindrical members, and a fastening mechanism that creates compressive forces to a pair of end caps of the stack of cylindrical members,
wherein the moveable valves are operable to regulate flow of a first inlet gas into the valve control to cause the pneumatic actuator to move in response to pressure of a second inlet gas in to the valve control.

15. The system of claim 14, further comprising:
a manifold disposed on the valve control, the manifold receiving the first inlet gas.

16. The system of claim 14, further comprising:
a manifold disposed on the valve control, the manifold comprising a no-bleed valve.

17. The system of claim 14, further comprising:
a mounting plate with slots, wherein the fastening mechanism can receive fasteners that attach the control valve to the mounting plate.

18. The system of claim 14, wherein the valve control is operable to allow gas to exhaust from the stack of cylindrical members in response to movement of the moveable valve components.

* * * * *